US006834667B2

(12) United States Patent
Sumiya et al.

(10) Patent No.: US 6,834,667 B2
(45) Date of Patent: Dec. 28, 2004

(54) ADJUSTMENT PIPE FOR FUEL INJECTION VALVE, AND PRESS-FITTING STRUCTURE AND PRESS-FITTING METHOD FOR THE SAME

(75) Inventors: Sadao Sumiya, Takahama (JP); Hiroatsu Yamada, Nagoya (JP)

(73) Assignee: Denso Corporation (JP)

( * ) Notice: Subject to any disclaimer, the term of this patent is extended or adjusted under 35 U.S.C. 154(b) by 310 days.

(21) Appl. No.: 09/985,802

(22) Filed: Nov. 6, 2001

(65) Prior Publication Data

US 2002/0062866 A1 May 30, 2002

(30) Foreign Application Priority Data

Nov. 29, 2000 (JP) ....................................... 2000-367754

(51) Int. Cl.$^{7}$ ........................ C23C 22/46; F02M 51/00; F02M 61/16; F16K 31/06

(52) U.S. Cl. .............................. 137/315.01; 29/407.01; 29/428; 29/458; 29/459; 29/460; 29/700; 29/888.41; 29/890.124; 73/861; 137/15.18; 137/315.03; 148/246; 148/252; 239/5; 239/533.11; 239/585.1; 239/585.4; 239/596; 239/600; 251/129.18; 251/129.21; 251/368

(58) Field of Search .......................... 29/458, 459, 460, 29/407.01, 407.08, 407.09, 428, 700, 888.41, 890.124, 888.4, 890.142, 890.143; 73/861; 137/315.01, 15.08, 15.17, 15.18, 315.03; 239/533.12, 596, 585.1, 585.4, 585.5, 600, 533.11, DIG. 19; 251/368, 129.18, 129.21; 148/243, 246, 252

(56) References Cited

U.S. PATENT DOCUMENTS 2,550,660 A * 4/1951 Amundsen .................. 148/252
2,813,816 A * 11/1957 Otto ........................... 148/252
3,218,201 A * 11/1965 Otto ........................... 148/252
3,632,452 A * 1/1972 Matlsushima et al. ...... 148/252
3,649,371 A * 3/1972 Tongyai ...................... 148/252
3,879,237 A * 4/1975 Faigen ........................ 148/252
4,625,919 A * 12/1986 Soma et al. ........... 251/129.21
5,165,656 A * 11/1992 Maier et al. ........... 251/129.21
5,620,513 A * 4/1997 Spearin et al. ................ 118/64
5,927,613 A * 7/1999 Koyanagi et al. ...... 251/129.21
5,950,932 A * 9/1999 Takeda et al. ........... 239/585.4
5,996,910 A * 12/1999 Takeda et al. ........... 239/585.1
6,183,570 B1 * 2/2001 Kawaguchi et al. ........ 148/243
6,186,472 B1 * 2/2001 Reiter ................... 251/129.21
2001/0010337 A1 * 8/2001 Kummer et al. ............... 239/5

FOREIGN PATENT DOCUMENTS

JP 8-261093 10/1996
JP 2000-104643 4/2000

* cited by examiner

*Primary Examiner*—George L. Walton
(74) *Attorney, Agent, or Firm*—Nixon & Vanderhye PC

(57) ABSTRACT

In a fuel injection valve, an adjustment pipe made of stainless steel and for adjusting a compression amount of a spring biasing a valve member is press-fitted into a cylindrical housing made of stainless steel, and a fuel injection amount is adjusted by adjusting a spring force of the spring in accordance with a press-fitted amount of the adjustment pipe. The adjustment pipe is immersed in an oxalic acid solution so that an oxalate film is formed thereon before being press-fitted into the cylindrical housing. Therefore, the oxalate film prevents a direct press-contact between an outer peripheral surface of the adjustment pipe and an inner peripheral surface of the cylindrical housing.

11 Claims, 6 Drawing Sheets

ADJUSTMENT PIPE FOR FUEL INJECTION VALVE, AND PRESS-FITTING STRUCTURE AND PRESS-FITTING METHOD FOR THE SAME

CROSS-REFERENCE TO RELATED APPLICATION

This application is related to Japanese Patent Application No. 2000-367754 filed on Nov. 29, 2000, the contents of which are hereby incorporated by reference.

BACKGROUND OF THE INVENTION

1. Field of the Invention

The present invention relates to an adjustment pipe for adjusting a compression amount of a spring biasing a valve member in a fuel injection valve, and a press-fitting structure and a press-fitting method of the adjustment pipe.

2. Description of Related Art

In a fuel injection valve, generally, a valve member (needle valve) for opening and closing a fuel injection port is biased by a spring, and a spring force of the spring is adjusted by an adjustment pipe disposed in a cylindrical housing. For fitting the adjustment pipe within the cylindrical housing, a caulking method or a press-fitting method may be used. In the caulking method, an outer radial dimension of the adjustment pipe is made slightly smaller than an inner radial dimension of the cylindrical housing, and the cylindrical housing is fastened and deformed to fix the adjustment pipe after the adjustment pipe is inserted into the cylindrical housing. On the other hand, in the press-fitting method, the outer radial dimension of the adjustment pipe is made slightly larger than the inner radial dimension of the cylindrical housing, and the adjustment pipe is fixed into the cylindrical housing by press-fitting the adjustment pipe into the cylindrical housing. In this case, when a fixing load (press-fitting load) of the adjustment pipe relative to the cylindrical housing is made larger for tightly fixing the adjustment pipe, the adjustment pipe and the cylindrical housing are strongly rubbed to each other, and an "adhesion" due to strongly rubbed metals is readily formed. Therefore, the press-fitting load is excessively increased, components such as the cylindrical housing may be deformed, and dimension accuracy of the components in the fuel injection valve may be decreased.

SUMMARY OF THE INVENTION

In view of the foregoing problems, it is an object of the present invention to provide an adjustment pipe for adjusting a compression force of a spring in a fuel injection valve, and a press-fitting structure of the adjustment pipe into a cylindrical housing, which can sufficiently maintain a dimension accuracy of the fuel injection valve.

In is an another object of the present invention to provide an adjustment pipe being press-fitted into a cylindrical housing in a fuel injection valve, which reduces a difference of press-fitting load of the adjustment pipe, readily performs a fine adjustment of a press-fitting amount of the adjustment pipe, and restricts a compression deformation of components of the fuel injection valve.

It is a further another object of the present invention to provide a press-fitting method for press-fitting an adjustment pipe into a cylindrical housing for a fuel injection valve, by which a high-quality and trustworthy fuel injection valve can be readily manufactured.

According to the present invention, in a press-fitting structure of an adjustment pipe for adjusting a compression amount of a spring member for biasing a valve member, a lubricating material is adhered or formed on at least one of an outer peripheral surface of the adjustment pipe and an inner peripheral surface of a cylindrical housing. Therefore, when the adjustment pipe is press-fitted into the cylindrical housing, because the lubricating material is placed between the adjustment pipe and the cylindrical housing, it can prevent a direct pressure-contact between both metal press-contacting surfaces of the adjustment pipe and the cylindrical housing, and it can restrict the adhesion from being generated. In addition, because the lubricating material is placed between the adjustment pipe and the cylindrical housing, the lubricating material does not increase a press-fitting load. Accordingly, a difference of the press-fitting load of the adjustment pipe can be made smaller, a fine adjustment of the press-fitting amount of the adjustment pipe can be made simple, and compression deformation due to an excessive press-fitting load can be restricted. Accordingly, when the press-fitting structure of the adjustment pipe is used for a fuel injection valve, a dimension accuracy of the fuel injection valve can be sufficiently maintained.

Preferably, each of the adjustment pipe and the cylindrical housing is made of stainless steel, and an oxalate film is formed on at least one of the outer peripheral surface of the adjustment pipe and the inner peripheral surface of the cylindrical housing. Alternatively, a phosphate film is formed on at least one of the outer peripheral surface of the adjustment pipe and the inner peripheral surface of the cylindrical housing. In this case, because the oxalate film or the phosphate film is not removed even when the adjustment pipe is press-fitted into the cylindrical housing, the dimension accuracy of the fuel injection valve can be readily maintained.

According to a press-fitting method for press-fitting an adjustment pipe into a cylindrical housing for a fuel injection valve, after a lubricating material is formed or adhered on at least one of an outer surface of the adjustment pipe and an inner surface of the cylindrical housing, the adjustment pipe is temporarily press-fitted into the cylindrical housing, and the press-fitted amount of the adjustment pipe into cylindrical housing is adjusted to a predetermined amount. In addition, a test liquid is supplied into a temporarily assembled fuel injection valve, and a confirmation operation of a fuel injection amount from the fuel injection port is repeated by opening and closing the valve member while the adjustment pipe being gradually press-fitted into the cylindrical housing. Accordingly, a stable fixing load of the adjustment pipe can be obtained, and a high-quality fuel injection valve can be readily manufactured.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
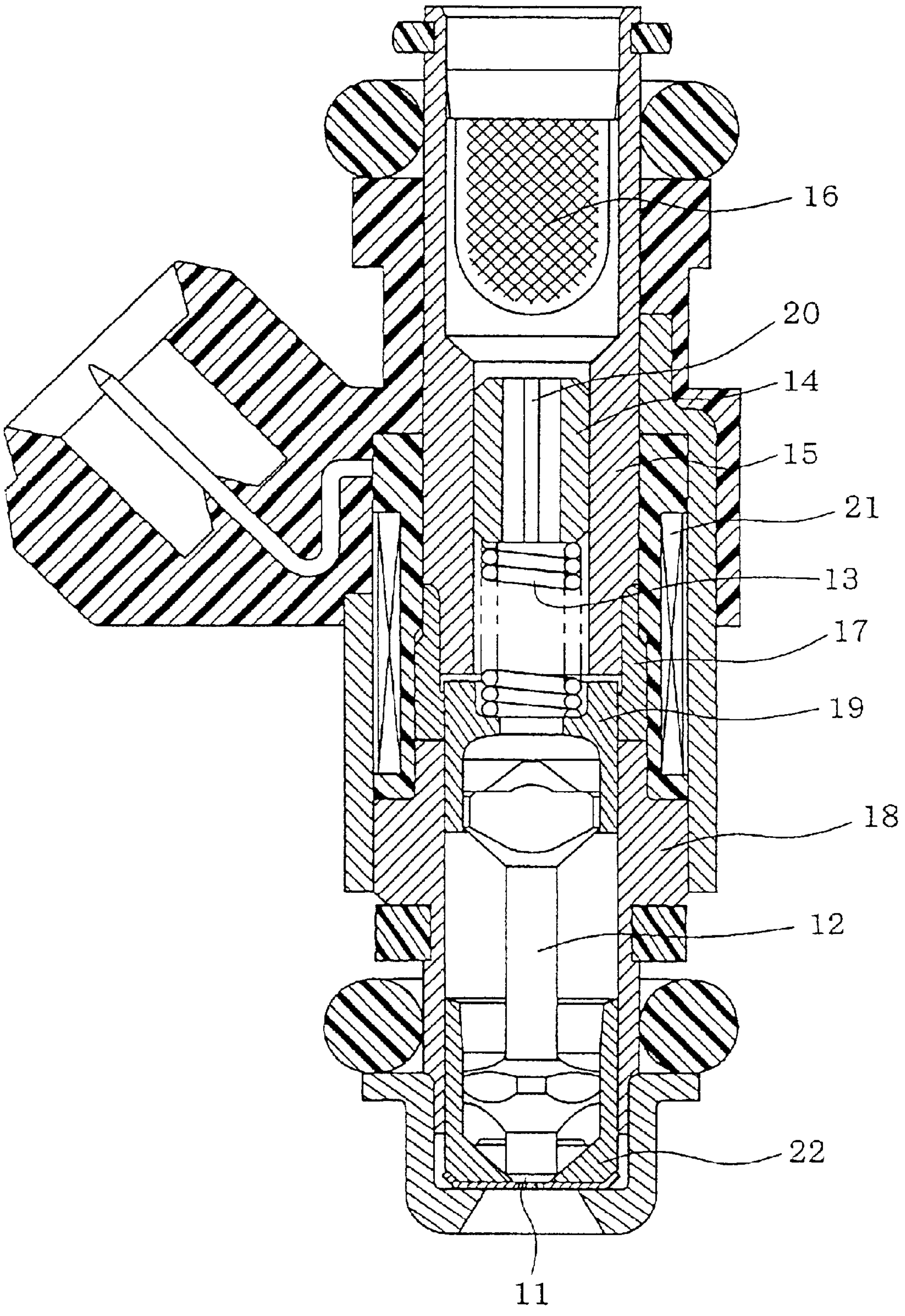
FIG. 1 is a vertical sectional view showing a fuel injection valve according to a first preferred embodiment of the present invention.

A first preferred embodiment of the present invention will be now described with reference to FIGS. 1–5. As shown in FIG. 1, in a fuel injection valve, a cylindrical housing 15 is made of a magnetic stainless steel, and is used as a fixed magnetic core. A fuel filter 16 is disposed at an upper side in the cylindrical housing 15. A middle pipe 17 made of a non-magnetic material is attached to a lower side portion of the cylindrical housing 15 by brazing, and a magnetic valve body 18 having therein a valve member 12 is bonded to a lower end of the middle pipe 17 by brazing. The valve member 12 is disposed to open and close a fuel injection port 11 from which fuel is injected. A hollow movable valve member 19 connected to a top end part of the valve 12 is disposed opposite to a bottom surface of the cylindrical housing 15, so that the movable core 19 and the valve 12 are biased to a valve-closing direction (i.e., lower side) by the spring force of a spring 13.

The spring 13 is disposed in a lower side portion within the cylindrical housing 15, and a top end portion of the spring 13 contacts a bottom end of the adjustment pipe 14 press-fitted into the cylindrical housing 15 from an upper side. By adjusting a press-fitting amount (inserted amount) of the adjustment pipe 14 within the cylindrical housing 15, the spring force (compression amount) of the spring 13 is adjusted so that a response of the valve member 12 is adjusted. Therefore, a fuel injection amount due to the valve member 12 can be adjusted by the adjustment of the spring force of the spring 13.

Figure 2A:
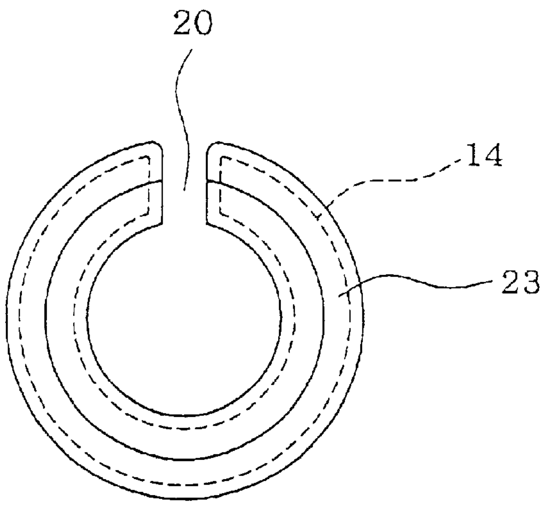
FIGS. 2A and 2B are a top view and a vertical sectional view, respectively, showing an adjustment pipe according to the first embodiment.
Figure 2B:
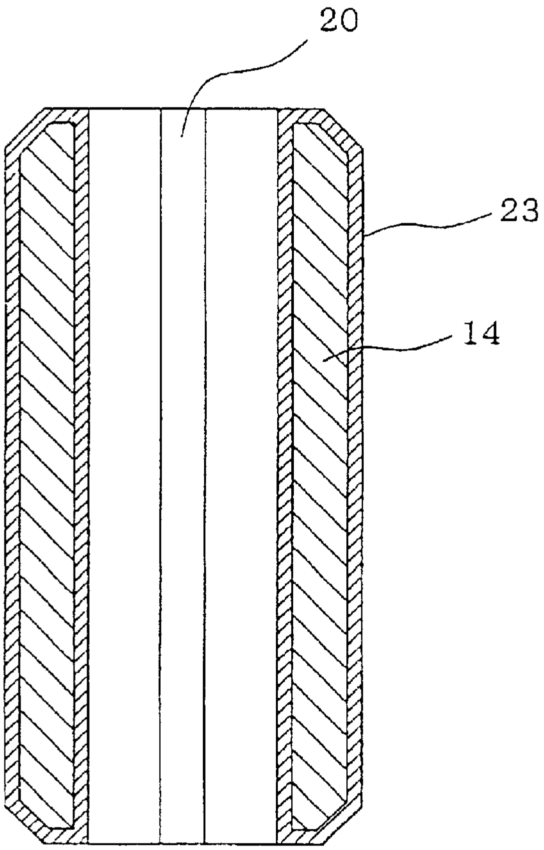
Figure 3A:
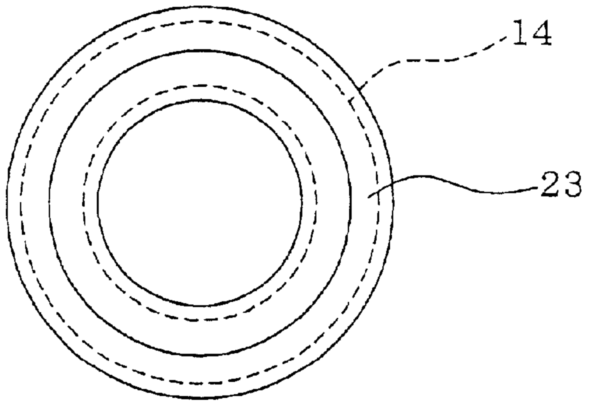
FIGS. 3A and 3B are a top view and a vertical sectional view, respectively, showing an adjustment pipe according to a modification of the first embodiment.
Figure 3B:
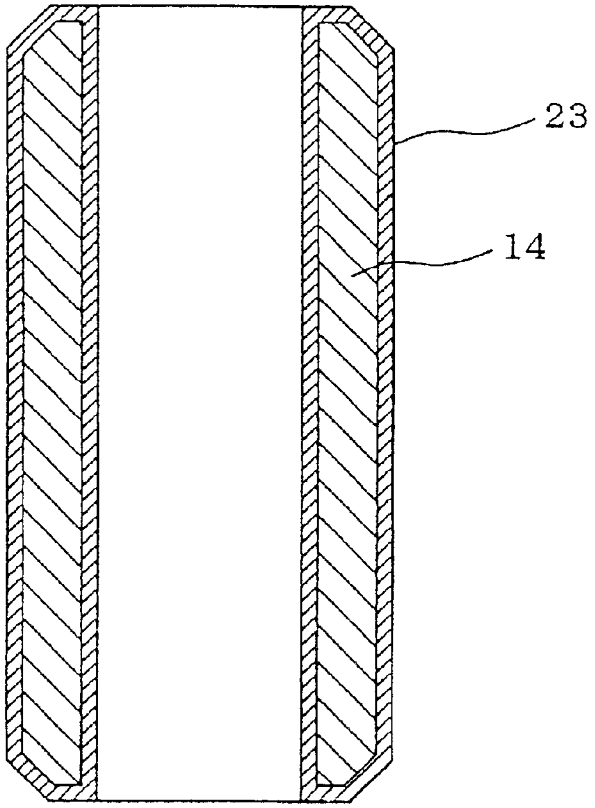

The adjustment pipe 14 is made of a stainless steel similarly to the cylindrical housing 15, for a rust prevention. As shown in FIGS. 2A and 2B, a straight slot 20 is provided in the adjustment pipe 14, so that the adjustment pipe 14 can be radial-deformed (radial-reduced) when being press-fitted into the cylindrical housing 15. However, as shown in FIGS. 3A and 3B, the adjustment pipe 14 can be formed into a stainless pipe without a slot.

Outer peripheral parts of the adjustment pipe 14 at both upper and lower ends are chamfered, so that the adjustment pipe 14 can be readily press-fitted into the cylindrical housing 15. A press-fitting load (fixing load) of the adjustment pipe 14 relative to the cylindrical housing 15 is adjusted by a dimension difference between an outer radial dimension of the adjustment pipe 14 and an inner radial dimension of the cylindrical housing 15.

An electromagnetic coil 21 is attached to an outer peripheral part of the middle pipe 17. When electrical power is supplied to the electromagnetic coil 21 and the electromagnetic coil 21 is energized, an electromagnetic force is applied between the cylindrical housing 15 (fixed core) and the movable magnetic core 19. In this case, the movable core 19 moves upwardly, a lower end of the valve member 12 is separated from a valve seat 22, and the fuel injection port 11 is opened.

In the first embodiment of the present invention, for reducing a change range (difference) of the press-fitting load of the adjustment pipe 14, an oxalate film 23 is formed on an outer peripheral surface of the adjustment pipe 14, as shown in FIGS. 2A, 2B, 3A and 3B. The oxalate film 23 is a chemical conversion coating using a lubricant. In the first embodiment, the adjustment pipe 14 is immersed in an oxalic acid solution for about 4-6 minutes under a temperature about 50–60° C., for example. Accordingly, iron (Fe) on the surface of the adjustment pipe 14 is reacted with the oxalic acid, and the film 23 of iron(II) oxide ($FeC_2O_4 \cdot 2H_2O$) is formed. The oxalate film 23 has a suitable lubricating performance, and is strongly bonded on the surface of the adjustment pipe 14, so that the oxalate film is not removed. In addition, the oxalate film 23 is not dissolved in a test liquid (e.g., dry solvent) that is used in place of gasoline in experiments.

In the first embodiment of the present invention, because the adjustment pipe 14 is immersed in the oxalic acid solution for forming the oxalate film 23 on the adjustment pipe 14, the oxalate film 23 are formed on both the outer peripheral surface and the inner peripheral surface of the adjustment pipe 14. However, since the press-fitting surface of the adjustment pipe 14 is only the outer peripheral surface of the adjustment pipe 14, the oxalate film 23 can be formed only on the outer peripheral surface of the adjustment pipe 14.

Figure 4A:
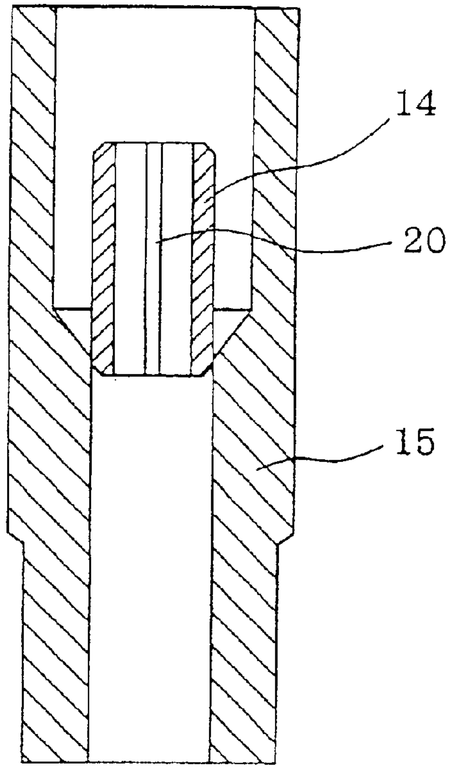
FIGS. 4A and 4B are vertical sectional views showing temporary press-fitting steps in a cylindrical housing, according to the first embodiment.
Figure 4B:
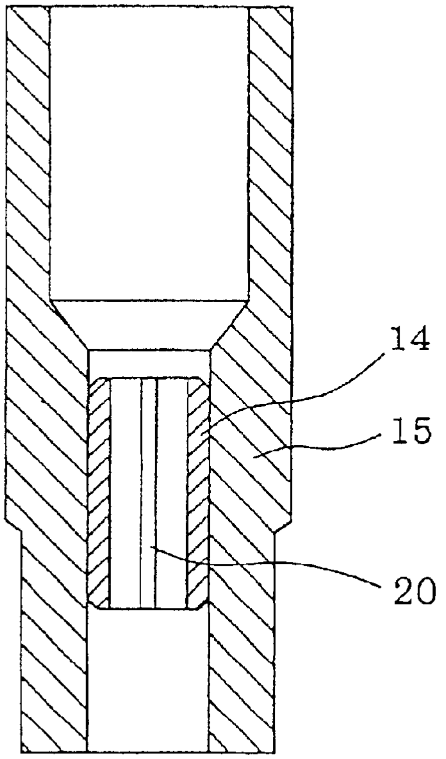

Next, a manufacturing method of the fuel injection valve will be now described. The adjustment pipe 14 is immersed in an oxalic acid solution, so that the oxalate film 23 is formed on the adjustment pipe 14 beforehand. On the other hand, the valve body 18, in which the valve member 12, the movable core 19 and the like are assembled, is fixed at a lower end of the cylindrical housing 15 through the middle pipe 17 by the brazing or the like, and thereafter, the spring 13 is disposed within the cylindrical housing 15. Then, the adjustment pipe 14 is pressed into the cylindrical housing 15 from an upper side as shown in FIG. 4A, and is temporarily press-fitted into the cylindrical housing 15 until a position shown in FIG. 4B. In the temporary press-fitting of the adjustment pipe 14, the oxalate film 23 on the outer surface of the adjustment pipe 14 is strongly rubbed with the inner peripheral surface of the cylindrical housing 15. However, because a bonding strength between the oxalate film 23 and the outer peripheral surface of the adjustment pipe 14 is strong, the adjustment pipe 14 can be press-fitted into the cylindrical housing 15 while the oxalate film 23 is not removed from the outer peripheral surface of the adjustment pipe 14.

Thereafter, the temporarily assembled fuel injection valve is set in a test machine, the test liquid used in place of gasoline is supplied to the fuel injection valve, and the valve member 12 is opened and closed while the adjustment pipe 14 is gradually press-fitted, so that the fuel injection amount is confirmed. By repeating the confirming operation, the press-fitting amount of the adjustment pipe 14 is adjusted so that a desired injection amount of the fuel injection valve can be obtained. At this time, the oxalate film 23 is maintained on the outer peripheral surface of the adjustment pipe 14 without being dissolved in the test liquid.

Because both the adjustment pipe 14 and the cylindrical housing 15 are made of the stainless steel, the adhesion (partially protrusion part) is readily generated when both the metal surfaces are strongly rubbed by a large friction force. However, in the first embodiment of the present invention, because the oxalate film 23 used as a solid lubricant is placed between the press-fitting surfaces of the adjustment pipe 14 and the cylindrical housing 15, it can prevent both the metal surfaces from being directly rubbed, and it can prevent the adhesion. In addition, because the oxalate film 23 placed between both the press-fitting surfaces of the adjustment pipe 14 and the cylindrical housing 15 has a suitable lubricating performance, the press-fitting load is not increased by the oxalate film 23. Accordingly, the adjustment pipe 14 can be smoothly press-fitted into the cylindrical housing 15, and the press-fitting amount of the adjustment pipe 14 can be readily adjusted.

Figure 5:
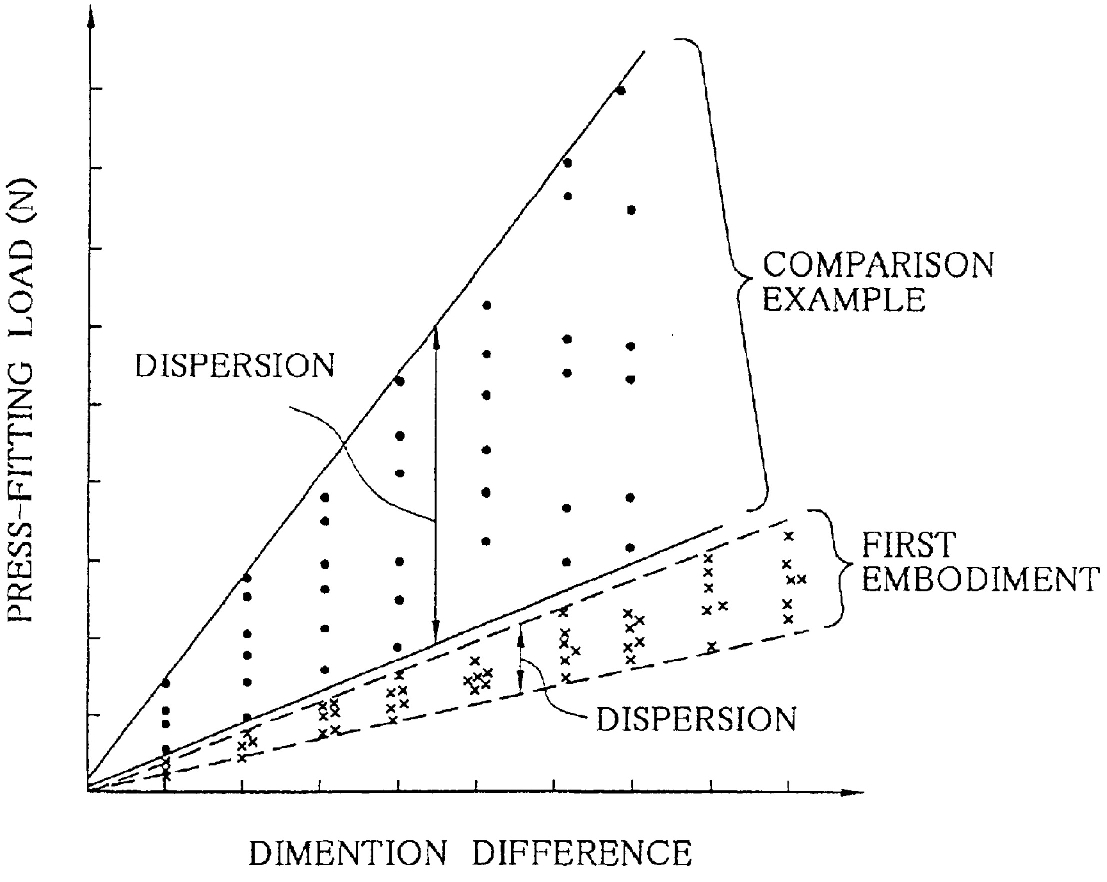
FIG. 5 is a graph for explaining an improved effect of the first embodiment as compared with a comparison example.

FIG. 5 is an experiment result performed by inventors of the present invention, showing a relationship between the press-fitting load (N) of the adjustment pipe 14 and the dimension difference between the outer radial dimension of the adjustment pipe 14 and the inner radial dimension of the cylindrical housing 15. In FIG. 5, the effect of the first embodiment is compared with a comparison example where the oxalate film 23 is not formed in the outer peripheral surface of the adjustment pipe 14. In the comparison example, because the metal surface of the adjustment pipe 14 is directly strongly rubbed with the metal surface of cylindrical housing 15, the adhesion is formed. Therefore, the press-fitting load of the adjustment pipe 14 is greatly increased, the adhesion is further readily formed, and the press-fitting load of the adjustment pipe 14 is greatly changed in a large range due to the adhesion. That is, because the dispersion of the press-fitting load of the adjustment pipe 14 becomes larger, it is difficult to perform a fine adjustment of the press-fitting amount of the adjustment pipe 14, and the adjustment pipe 14 may be excessively press-fitted. In this case, the spring force of the spring 13 cannot be adjusted by the adjustment pipe 14. In addition, when the press-fitting load of the adjustment pipe 14 becomes excessively larger due to the adhesion, the cylindrical housing 15 and the other members of the fuel injection valve may be deformed, and dimension accuracy in the fuel injection valve is decreased.

However, according to the first embodiment of the present invention, because the oxalate film 23 is formed on the outer surface of the adjustment pipe 14, the adhesion can be prevented and the suitable lubricating performance can be obtained by the oxalate film 23. Thus, the dispersion of the press-fitting load of the adjustment pipe 14 can be made greatly smaller as compared with the comparison example, the press-fitting amount of the adjustment pipe 14 can be finely adjusted, and it can prevent the adjustment pipe 14 from being over-fitted. As a result, a compression deformation of the components of the fuel injection valve, due to an excessive press-fitting load, can be restricted, and the dimension accuracy of the components of the fuel injection valve can be effectively maintained.

In the first embodiment, because the dispersion of the press-fitting load of the adjustment pipe 14 is made smaller, the press-fitting load and the fixing load of the adjustment pipe 14 can be readily adjusted by the difference between the outer radial dimension of the adjustment pipe 14 and the inner radial dimension of the cylindrical housing 15, and a stable fixing load having the smaller dispersion can be obtained. Therefore, a high-quality and trustworthy fuel injection valve having a small change in the injection characteristics can be readily manufactured with a simple manufacturing method.

The oxalate film 23 formed on the surface of the adjustment pipe 14 is not dissolved in the test liquid.

Therefore, it can prevent a friction consumption of a test machine or the fuel injection valve due to a removing or dissolution of the oxalate film 23. Further, in the first embodiment, a volatile cleaner agent having a high-relationship with gasoline in the fuel injection valve can be used as a test liquid. In this case, safety operation of an operator in the adjustment test of the fuel injection amount can be improved.

In the first embodiment of the present invention, as a solid lubricant formed on the surface of the adjustment pipe 14, the chemical film of iron (II) oxalate is used. However, instead of the iron (II) oxalate film, the other chemical film such as a phosphate film can be also used. Further, the chemical film can be formed on the press-fitting surface of the adjustment pipe 14 or the cylindrical housing 15 through a chemical processing or a physical-chemistry processing. In addition, a high polymer lubricant (shearable high polymer material such as nylon and polyimide), a soft metal solid lubricant (plastic deformable metal such as tin and zinc, or a stratified solid lubricant (a material shearing between layers of a stratified crystal structure) may be bonded or formed on the press-fitting surface of the adjustment pipe 14. Each of the solid lubricants is readily used after being formed on the press-fitting surface, is difficult to be removed from the press-fitting surface, and can be effectively used as a lubricant.

Figure 6A:
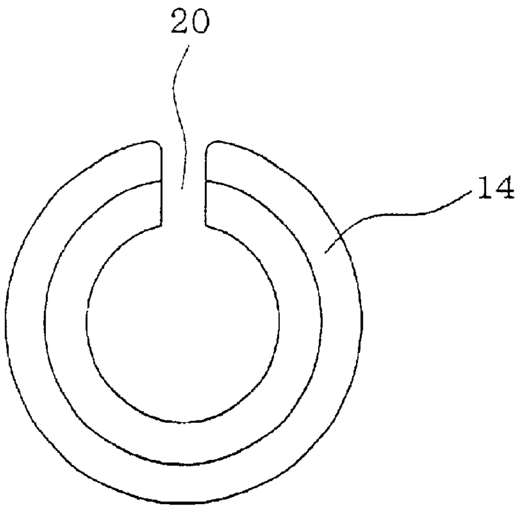
FIG. 6A, FIG. 6B and FIG. 6C are a top view, a vertical sectional view and a front view, respectively, showing an adjustment pipe for a fuel injection valve, according to a second preferred embodiment of the present invention.
Figure 6B:
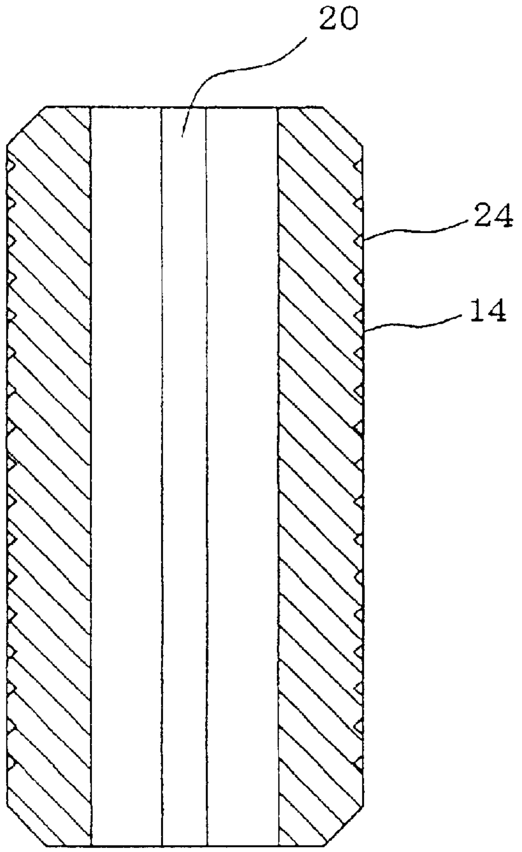
Figure 6C:
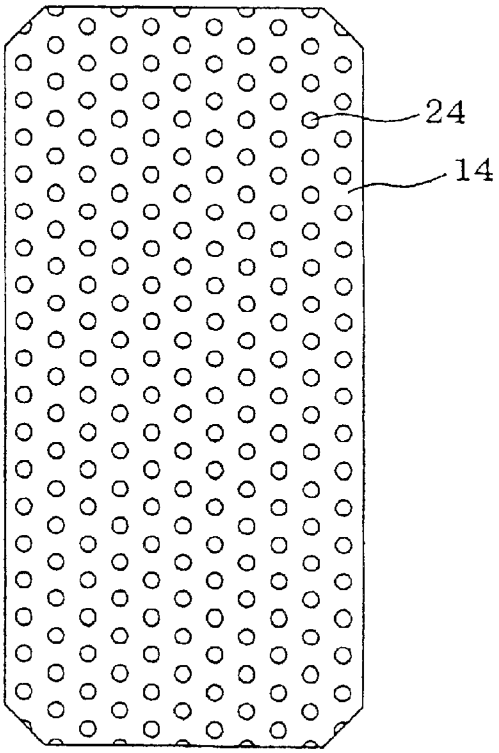

A second preferred embodiment of the present invention will be now described with reference to FIGS. 6A–6C. In the above-described first embodiment of the present invention, the solid lubricant is bonded or formed on the outer peripheral surface (i.e., press-fitting surface) of the adjustment pipe 14. In the second embodiment of the present invention, the outer peripheral surface of the adjustment pipe 14 is formed into a roughened surface by knurling or chemical process, so that plural fine recesses 24 are formed on the outer peripheral surface of the adjustment pipe 14. Then, a lubricating oil (e.g., machine oil) is adhered on the roughened surface of the adjustment pipe 14. In the second embodiment, a depth of the fine recesses 24 is set in a range of 0.005–0.3 mm, and an opening width thereof is set in a range of 0.05–0.3 mm. In the second embodiment, the other structures and the other manufacturing method of the fuel injection valve are the same as that described in the first embodiment.

According to the second embodiment of the present invention, the roughened surface is formed on the outer peripheral surface of the adjustment pipe 14. Therefore, the lubrication oil can be held in the fine recesses 24 between the outer peripheral surface of the adjustment pipe 14 and the inner peripheral surface of the cylindrical housing 15 when the adjustment pipe 14 is press-fitted into the cylindrical housing 15, and an oil film can be formed between the outer peripheral surface of the adjustment pipe 14 and the inner peripheral surface of the cylindrical housing 15. Due to the oil film, a suitable lubricating performance can be obtained while the adhesion is prevented. Accordingly, in the second embodiment, the effects similar to that of the above-described first embodiment can be obtained. In addition, because the lubricating oil is sealed in the fine recesses 24 between the outer peripheral surface of the adjustment pipe 14 and the inner peripheral surface of the cylindrical housing 15, it can prevent the lubricating oil from being leaked into the test liquid.

Although the present invention has been fully described in connection with the preferred embodiments thereof with reference to the accompanying drawings, it is to be noted that various changes and modifications will become apparent to those skilled in the art.

For example, in the above-described first and second embodiments of the present invention, the lubricating material is adhered or formed on the outer peripheral surface of the adjustment pipe 14. However, the lubricating material can be adhered or formed on the inner peripheral surface of the cylindrical housing 15, or can be adhered or formed on both the outer peripheral surface of the adjustment pipe 14 and the inner peripheral surface of the cylindrical housing 15.

In the above-described first and second embodiments of the present invention, the present invention is typically applied to the fuel injection valve. However, the present invention can be applied a valve device having an adjustment pipe for adjusting the spring force of a spring, such as a relief valve.

Such changes and modifications are to be understood as being within the scope of the present invention as defined by the appended claims.

What is claimed is:

1. A press-fitting structure of an adjustment pipe for adjusting a compression amount of a spring member for biasing a valve member, the press-fitting structure comprising:

a cylindrical housing having an inner peripheral surface defining a cylindrical space in which the adjustment pipe is press-fitted to adjust the compression amount of the spring member by an adjustment of a press-fitted amount of the adjustment pipe; and a lubricating material on at least one of an outer peripheral surface of the adjustment pipe and the inner peripheral surface of the cylindrical housing, wherein:

the lubricating material is a solid lubricant;

each of the adjustment pipe and the cylindrical housing is made of stainless steel; and the solid lubricant is an oxalate film formed on at least one of the outer peripheral surface of the adjustment pipe and the inner peripheral surface of the cylindrical housing.

2. An adjustment pipe being press-fitted into a cylindrical housing, for adjusting a spring force of a spring member biasing a valve member, the adjustment pipe comprising:

a lubricating material on an outer peripheral surface of the adjustment pipe, wherein the lubricating material is a solid lubricating film formed on the outer peripheral surface of the adjustment pipe, and the solid lubricating film is an oxalate film.

3. The press-fitting structure according to claim 2, wherein the oxalate film is formed on all surfaces of the adjustment pipe including an inner peripheral surface and the outer peripheral surface thereof.

4. A press-fitting method for press-fitting an adjustment pipe into a cylindrical housing for a fuel injection valve, the adjustment pipe being for adjusting a compression amount of a spring member biasing a valve member opening and closing a fuel injection port by an adjustment of a press-fitted amount of the adjustment pipe into the cylindrical housing, the press-fitting method comprising:

forming a lubricating material on at least one of an outer surface of the adjustment pipe and an inner surface of the cylindrical housing;

temporarily press-fitting the adjustment pipe into the cylindrical housing; and adjusting the press-fitted amount of the adjustment pipe into cylindrical housing to a predetermined amount, wherein, in the adjusting, a test liquid is supplied into a temporarily assembled fuel injection valve, and repeating a confirmation operation of a fuel injection amount from the fuel injection port by opening and closing the valve member while the adjustment pipe being gradually press-fitted into the cylindrical housing.

5. The press-fitting method according to claim 4, wherein, in the forming, a solid lubricating film is formed on at least one of the outer surface of the adjustment pipe and the inner surface of the cylindrical housing.

6. The press-fitting method according to claim 5, wherein the solid lubrication film is an oxalate film.

7. A press-fitting method for press-fitting an adjustment pipe into a cylindrical housing for a fuel injection valve, the adjustment pipe being for adjusting a compression amount of a spring member biasing a valve member opening and closing a fuel injection port by an adjustment of a press-fitted amount of the adjustment pipe into the cylindrical housing, the press-fitting method comprising:

providing a plurality of fine recesses on one of an outer surface of the adjustment pipe and an inner surface of the cylindrical housing;

adhering a lubricating material on the one of the outer surface of the adjustment pipe and the inner surface of the cylindrical housing;

temporarily press-fitting the adjustment pipe into the cylindrical housing; and adjusting the press-fitted amount of the adjustment pipe into cylindrical housing to a predetermined amount, wherein, in the adjusting, a test liquid is supplied into a temporarily assembled fuel injection valve, and repeating a confirmation operation of a fuel injection amount from the fuel injection port by opening and closing the valve member while the adjustment pipe being gradually press-fitted into the cylindrical housing.

8. A press-fitting structure of an adjustment pipe for adjusting a compression amount of a spring member for biasing a valve member, the press-fitting structure comprising:

a cylindrical housing having an inner peripheral surface defining a cylindrical space in which the adjustment pipe is press-fitted to adjust the compression amount of the spring member by an adjustment of a press-fitted amount of the adjustment pipe; and a lubricating material on at least one of an outer peripheral surface of the adjustment pipe and the inner peripheral surface of the cylindrical housing, wherein the lubricating material is an oxalate film formed on all surfaces of the adjustment pipe including an inner peripheral surface and the outer peripheral surface thereof.

9. A press-fitting structure of an adjustment pipe for adjusting a compression amount of a spring member for biasing a fuel injection valve member, the adjustment pipe having an inner peripheral surface defining a fuel passage through which a fuel flows, the press-fitting structure comprising:

a cylindrical housing having an inner peripheral surface defining a cylindrical space in which the adjustment pipe is press-fitted to adjust the compression amount of the spring member by an adjustment of a press-fitted amount of the adjustment pipe; and an oxalate film as a lubricating material on all surfaces of the adjustment pipe including the inner peripheral surface and an outer peripheral surface of the adjustment pipe.

10. The press-fitting structure according to claim 9, wherein each of the adjustment pipe and the cylindrical housing is made of stainless steel.

11. A press-fitting method for press-fitting an adjustment pipe into a cylindrical housing for a fuel injection valve, the adjustment pipe being for adjusting a compression amount of a spring member biasing a fuel injection valve member opening and closing a fuel injection port by an adjustment of a press-fitted amount of the adjustment pipe into the cylindrical housing, the adjustment pipe having an inner peripheral surface defining a fuel passage through which a fuel flows, the press-fitting method comprising:

forming an oxalate film on all surfaces of the adjustment pipe including the inner peripheral surface and an outer peripheral surface of the adjustment pipe;

temporarily press-fitting the adjustment pipe into the cylindrical housing; and adjusting the press-fitted amount of the adjustment pipe into cylindrical housing to a predetermined amount, wherein, in the adjusting, a test liquid is supplied into a temporarily assembled fuel injection valve, and repeating a confirmation operation of a fuel injection amount from the fuel injection port by opening and closing the valve member while the adjustment pipe is gradually press-fitted into the cylindrical housing.

* * * * *